Patented May 16, 1933

1,909,546

UNITED STATES PATENT OFFICE

VITTORIO MOLINARI, OF MILAN, ITALY, ASSIGNOR TO BAKELITE CORPORATION, OF NEW YORK, N. Y., A CORPORATION OF DELAWARE

PURIFICATION OF PHENOLS

No Drawing.    Application filed July 6, 1931. Serial No. 549,093.

This invention relates to the purification of phenols such as phenol, cresol and xylenol and their homologs, by removing certain of the impurities found either in crude synthetic products or in phenolic mixtures or raw tar acids obtained from coal, lignite, peat, etc.

Phenols are much used in the art and for most purposes pure compounds are required. For instance, some of the impurities present in raw tar acids have decidedly objectionable odors, particularly the sulphur compounds, mercaptans, thiophenols, etc., and if these remain, the compositions prepared from them are rendered similarly objectionable. Other impurities which create trouble in the use of phenols or are otherwise undesirable are the constituents of middle oil tar, indene, naphthalene, etc.; pyridine bases, chinolins, lutidines, picolines, pyrroles, etc.; and volatile organic metal compounds, of iron, aluminum, etc. Practically complete removal of these impurities is necessary to render the phenols contained in the tar acids fit for commercial applications.

Separation of these impurities by the usual distillation or extraction methods presents difficulties and complications, and generally involves chemical reaction with the phenolic bodies. According to the present invention, however, a simple, expeditious separation is provided, which is surprisingly complete and does not necessitate any chemical change of the phenols. It is based on the discovery that if some agent such as water, water-alcohol or other suitable volatile liquid, and which may be termed a transporter, is added to the raw tar acid in a still, mixtures can be formed with the impurities of a character which I denominate as azeotropic, having such low distillation temperatures that the impurities are carried off with substantial completeness materially below the temperatures at which appreciable quantities of the phenols begin to come over. After the transporter and the entrained impurities have been removed, the phenols remaining can then be separated by distillation in the usual manner.

The amount and kind of transporter used will depend upon the nature and proportions of impurities present. In general, water alone is usually found sufficient for removing the objectionable impurities to the requisite extent, but other agents such as alcohol and water can be used where a lower boiling point agent or the formation of a low boiling point mixture or compound with an impurity is indicated as desirable. While it is preferable that the transporter used goes into solution with the phenols, it should not be of such a nature as to react or so affect them as to cause their distillation with the impurities. It is, moreover, of practical importance to obtain the requisite completeness of removal of impurities while leaving as small an amount as possible of the transporter in the phenols. This determination can be made by analyses on the raw tar acids before the still operation is begun to fix the ratio of the transporter in accordance with the nature and quantity of impurities to be removed. With the preferred condition of slight or no solubility between the impurities and the transporter, each will have a definite partial vapor pressure at the temperature and pressure of distillation, thereby affording a means for the calculation of the transporter addition to effect required vaporization of the impurities. Further control of the separation is made possible by regulating the distillation temperatures through the use of either a partial vacuum or pressure above atmospheric.

As an example of the method, about 2000 lbs. of a crude phenol containing impurities as previously mentioned has added thereto from 300 to 900 lbs. of an alcohol-water mixture (not exceeding 90 per cent alcohol) in a still which may have any suitable type of rectification column such as a plate column, filled column, etc. Thereupon heat is applied to boil the mixture and the distillate when condensed is found to consist almost wholly of alcohol, water and the impurities, some of which can be decanted or filtered from the alcohol; the alcohol or a part thereof, which is thus obtained can be used for any other batch of crude phenol either directly or after a further treatment to remove any traces of the impurities. The residue in the still comprises phenol, cresols and xylenols which are thus separated from the impurities; these may then be distilled in the same or another still, to separate them from each other and such high boiling point impurities as pitch, tar acid condensates, or resins.

As another example, 300 to 900 lbs. of water with no alcohol are added to 2000 lbs. of an impure phenol containing the above mentioned impurities. The distillate may contain small amounts of phenols together with the impurities but are readily separated from latter by forming a phenol-water solution, which can then be used for another operation.

The pyridine base impurities do not form azeotropic mixtures but instead form hydrates with the water, which distil at temperatures lower than 100° C. and are the easiest of the impurities to remove from the crude phenol. When the impurities in the crude phenol are mostly pyridine bases, a rather smaller amount of water, say from 100 to 300 lbs. of water is added to 2000 lbs. of crude phenol.

Naphthalenes and the sulphur compounds such as the thiophenols, which quite frequently occur in the crude synthetic phenol as well as in the natural phenolic tars, are the most difficult impurities to separate. The preferred process when these impurities are present, is to add to 2000 lbs. of the crude synthetic or natural phenol, approximately 500 lbs. of water which is then distilled. The last runnings of the distillate are tested for naphthalene and sulphur compounds and high boiling hydroxy compounds. If any of these impurities are found to be present, another quantity of water is added to the crude phenol in the still and the distillation is repeated until the distillate gives no indication of sulphur compounds, naphthalene or high boiling hydroxy compounds being present. The process is preferably run in this way because it is considered to be easier to test the last runnings of the distillate for these impurities than it is to determine the amount of these impurities in the crude phenol and then calculate the amount of transporting liquid which must be added to get all of them out of the crude phenol. This method may also be used with the other impurities, if desired, the choice of methods depending upon what is easiest to use in the plant when the process is being run.

For convenience of reference, the mixtures which the transporter forms with the impurities, that is mixtures which give vapors having constant proportions of impurities and transporter at certain temperatures and pressures, are referred to as "azeotropic" mixtures irrespective of whether or not the vapors have the same composition as the original mixture.

From the above description and the several examples, it will be seen that there are numerous ways to carry out the invention. The transporter which is used should form with the impurities a vapor mixture coming over at a temperature substantially below the temperature at which the phenols or other desired product will distil, either by itself or with the transporter. On the other hand the transporter should not react with the desired product, in this case phenol, cresol and xylenol and their homologs, to cause loss of the desired product. It is therefore to be understood that the invention is to be construed as broadly as the claims, taken in conjunction with the prior art, may allow.

I claim:

1. In a method of purifying an impure phenolic mixture containing a phenol and an impurity characterized by the property of forming with water an azeotropic mixture having a lower distillation temperature than that of water and the phenol, the steps of adding water to said impure phenolic mixture and distilling at such a temperature that the impurity is vaporized with the water leaving the phenol in the still.

2. In a method of purifying an impure phenolic mixture containing a phenol and an impurity characterized by the property of forming with a vaporizable liquid a mixture having a lower distillation temperature than that of water and the phenol, the steps of adding said liquid to said impure phenolic mixture and distilling at such a temperature that the impurity is vaporized with the liquid leaving the phenol in the still.

3. In a method of purifying an impure phenolic mixture containing a phenol and an impurity characterized by the property of forming with water a compound which has a lower distillation temperature than the combination of water with the phenol, the steps of adding water to said impure phenolic mixture and distilling at such a temperature that the impurity is vaporized with the water leaving the phenol in the still.

4. In a method of purifying an impure phenolic mixture containing a phenol and an impurity, the step of preparing a charge by adding to the impure phenolic mixture a liquid characterized by the property of forming an azeotropic mixture with the impurity, the said azeotropic mixture having a lower distillation temperature than the combination of the liquid with the phenol, and distilling the charge at such a temperature that the impurity is vaporized with said liquid leaving the phenol in the still.

5. In a method of purifying an impure phenolic mixture containing a phenol and an impurity, the step of preparing a charge by adding to the impure phenolic mixture a liquid characterized by the property of forming a compound with the impurity, said compound having a lower distillation temperature than the combination of the liquid with the phenol, and distilling the charge at such a temperature that the impurity is vaporized with said liquid leaving the phenol in the still.

6. In a method of purifying an impure phenolic mixture containing a phenol and impurities, the step of preparing a charge by adding to the impure phenolic mixture a liquid characterized by the property of forming an azeotropic mixture and a compound with the impurities, said azeotropic mixture and compound having lower distillation temperatures than the combination of the liquid with the phenol, and distilling the charge at such a temperature that the impurities are vaporized with said liquid leaving the phenol in the still.

7. In a method of purifying an impure phenolic mixture containing a phenol and an impurity characterized by the property of forming with water an azeotropic mixture which has a lower distillation temperature than the combination of water with the phenol, the steps of adding to said impure phenolic mixture an admixture of water and a component to change the boiling point of the water, and distilling at such a temperature that the impurity is vaporized with the water leaving the phenol in the still.

8. In a method of purifying an impure phenolic mixture containing a phenol and an impurity characterized by the property of forming with water a compound which has a lower distillation temperature than the combination of water with the phenol, the steps of adding to said impure phenolic mixture an admixture of water and a component to change the boiling point of the water, and distilling at such a temperature that the impurity is vaporized with the water leaving the phenol in the still.

9. Method of crude phenol purification which comprises adding to a crude phenol an agent characterized by solubility with a phenol contained therein and the formation of a depressed boiling point mixture with an impurity present, and subjecting the mass to distillation at a temperature causing vaporization of the mixture.

10. In a method of purifying an impure phenolic mixture containing a phenol and an impurity characterized by the property of forming with an added ingredient a mixture having a lower distillation temperature than that of said phenol and said ingredient, the steps of adding said ingredient to the impure phenolic mixture and distilling at such a temperature that a mixture of the impurity and said added ingredient is vaporized leaving the phenol in the still.

In testimony whereof, I affix my signature.

VITTORIO MOLINARI.